(12) United States Patent
Satou

(10) Patent No.: US 6,710,834 B2
(45) Date of Patent: Mar. 23, 2004

(54) IPS TYPE COLOR LCD PANEL HAVING UNIFORMLY DISPERSED SPACER PARTICLES

(75) Inventor: Masaki Satou, Akita (JP)

(73) Assignee: NEC LCD Technologies, Ltd., Kanagawa (JP)

(*) Notice: Subject to any disclaimer, the term of this patent is extended or adjusted under 35 U.S.C. 154(b) by 0 days.

(21) Appl. No.: 09/896,556

(22) Filed: Jun. 29, 2001

(65) Prior Publication Data

US 2002/0005923 A1 Jan. 17, 2002

(30) Foreign Application Priority Data

Mar. 27, 2000 (JP) .......................... 2000-87489

(51) Int. Cl.⁷ .................... G02F 1/1343; G02F 1/1335; G02F 1/1333; G02F 1/1339
(52) U.S. Cl. ................ 349/141; 349/106; 349/110; 349/138; 349/155
(58) Field of Search ............... 349/106, 110, 349/141, 138, 155, 156

(56) References Cited

U.S. PATENT DOCUMENTS 5,705,302 A * 1/1998 Ohno et al. .................. 205/109
6,040,887 A * 3/2000 Matsuyama et al. ........ 349/110
6,310,667 B1 * 10/2001 Nakayoshi et al. ........... 257/72
6,414,732 B1 * 7/2002 Matsumoto et al. ........ 349/106
2002/0089624 A1 * 7/2002 Matsumoto ................ 349/106

FOREIGN PATENT DOCUMENTS

| JP | 8-76099 | 3/1996 |
| JP | 9-311324 | 12/1997 |
| JP | 11-38420 | 2/1999 |
| JP | 11-64885 | 3/1999 |
| JP | 11-218771 | 8/1999 |
| JP | 3044788 | 3/2000 |

* cited by examiner

Primary Examiner—Tarifur R. Chowdhury
(74) Attorney, Agent, or Firm—Choate, Hall & Stewart

(57) ABSTRACT

Specific resistances of a red color layer, a green color layer and a blue color layer on a color filter side of an in-plane-switching (IPS) type color LCD panel is unified such that resistivity of each of the color layers satisfies a condition of (maximum resistivity)/(minimum resistivity) ratio $\leq 6 \times 10^2$, so that a dispersion of cell gap spacers is made uniform and degradation of display due to unevenness of spacer dispersion is reduced.

7 Claims, 3 Drawing Sheets

ELECTRIC CHARGE

IPS TYPE COLOR LCD PANEL HAVING UNIFORMLY DISPERSED SPACER PARTICLES

BACKGROUND OF THE INVENTION

1. Field of the Invention

The present invention relates to a color liquid crystal display panel and, particularly, to a color filter substrate of a color liquid crystal display panel of an In-Plane-Switching type.

2. Description of the Prior Art

A color filter (CF) substrate of a color liquid crystal display (LCD) cell includes a red (R) color layer, a green (G) color layer and a blue (B) color layer. In order to obtain desired chromaticity of these color layers, each color layer has been formed of transparent resin such as acrylic resin containing a pigment and an additive such as a dispersing agent. Since it is required, in order to realize a uniform cell gap of the LCD cell, to make a surface of the CF substrate on which the color layers are formed as flat as possible, the respective color layers are formed such that they have the same thickness.

When the requirements of chromaticity and thickness of the respective color layers are to be satisfied predominantly, specific resistance, that is, resistivity, of each of the color layers may substantially vary in a range of $10^7 \sim 10^{14}$ ($\Omega$.cm). Particularly, it is known that the resistivity of the red color layer is very large compared with those of the green color layer and the blue color layer. It is further known that such large difference in resistivity between the color layers leads to a difference in amount of electric charge between the color layers and, therefore, there is a problem that a distribution of spacer particles in a cell gap becomes varied in dispersing spacer particles by the dry dispersing method, causing a display performance of the color LCD panel to be degraded.

In order to solve the above problem, Japanese Unexamined Patent Publication No. H11-38420 discloses a technique in which a light shield such as a black matrix is charged in one polarity and spacer particles are charged in the opposite polarity such that the spacer particles are selectively dispersed on only the light shield.

On the other hand, Japanese Patent No. 3044788 discloses a technique in which an influence of voltage drop in color layers of a color filter used in a LCD panel is reduced by reducing resistivity of the respective color layers although a drive mode thereof is not limited to the In-Plane-Switching (IPS) type. In this Japanese patent, the resistivity of each of R, G and B color layers is restricted to $10^8$ ($\Omega$.cm) or less by dispersing particles of indium-tin-oxide (ITO) in the respective color layers.

When the resistivity of the respective color layers are substantially reduced as in this patent, the IPS mode drive cannot be established. Therefore, the technique disclosed in Japanese Patent No. 3044788 cannot be applied to the IPS type color LCD cell.

SUMMARY OF THE INVENTION

Under the circumstances, an object of the present invention is to provide a color filter having color layers, which can satisfy desired chromaticity thereof without reducing resistivity of the respective color layers too much and which have uniform spacer distribution even when spacer particles are dispersed by using the dry dispersing method.

The present invention is based on the fact, which has been confirmed by experiments conducted by the present inventors, that, by combining color layers in such a way that the resistivity of each color layer is $10^{10}$ ($\Omega$.cm) or less and a ratio of the resistivity between the respective color layers becomes 600 or less, the chromaticity of the respective color layers can be satisfied and the influence of the spacer distribution on the display characteristics of the color LCD panel is negligible.

An IPS type color LCD panel according to a first aspect of the present invention includes color layers provided on a substrate to provide three primary colors (red, green and blue), a black matrix provided on the substrate and burying at least gaps between the color layers and an insulating film covering a surface of the substrate including the color layers and the black matrix, wherein maximum value of the resistivity of each of the color layers is set to $6 \times 10^2$ or less times minimum value of the resistivity thereof. With this setting of the maximum value of the resistivity of each color layer with respect to the minimum value thereof, there is substantially no variation of display, which is caused by variation of distribution of dispersed spacer particles.

According to a second aspect of the present invention, the IPS type color LCD panel is featured by comprising a color filter substrate having a red color layer, a green color layer and a blue color layer arranged thereon such that the color layers are separated from each other by a black matrix layer, an electrode substrate arranged in an opposing relation to the color filter substrate through spacer particles and having pixel electrodes and a liquid crystal layer pinched between the color filter substrate and the electrode substrate, wherein a maximum resistivity of each color layer is set to $6 \times 10^2$ or less times a minimum resistivity thereof.

The IPS type color LCD panel according to the second aspect of the present invention is further featured by that spacer particles are dispersed by dry-dispersing method. The present invention is further featured by that the respective color layers and the black matrix layer on the color filter substrate are commonly covered by an overcoat layer. The present invention is further featured by that an alignment layer is formed on the overcoat layer. Furthermore, the present invention is featured by that the color layers are formed of transparent resin containing pigments and dispersing agent, respectively.

According to a third aspect of the present invention, the IPS type color LCD panel is featured by comprising a color filter substrate having a red color layer, a green color layer and a blue color layer arranged thereon such that the color layers are separated from each other by a black matrix layer, an active matrix substrate arranged in an opposing relation to the color filter substrate through spacer particles and having a plurality of pixel electrodes connected to a plurality of switching elements and a common electrode and a liquid crystal layer pinched between the color filter substrate and the active matrix substrate, wherein a maximum resistivity of each color layer is set to $6 \times 10^2$ or less times a minimum resistivity thereof.

In this IPS type color LCD panel, the resistivity of each color layer is $10^{10}$ ($\Omega$.cm) or more and, preferably, in a range from $1 \times 10^{11}$ ($\Omega$.cm) to $1 \times 10^{16}$ ($\Omega$.cm). More preferably, the resistivity of the red color layer is in a range from $1 \times 10^{13}$ ($\Omega$.cm) to $1 \times 10^{14}$ ($\Omega$.cm) and the resistivity of the green color layer as well as the blue color layer is in a range from $1 \times 10^{12}$ ($\Omega$.cm) to $1 \times 10^{13}$ ($\Omega$.cm).

DETAILED DESCRIPTION OF THE PREFERRED EMBODIMENTS

Figure 1A:
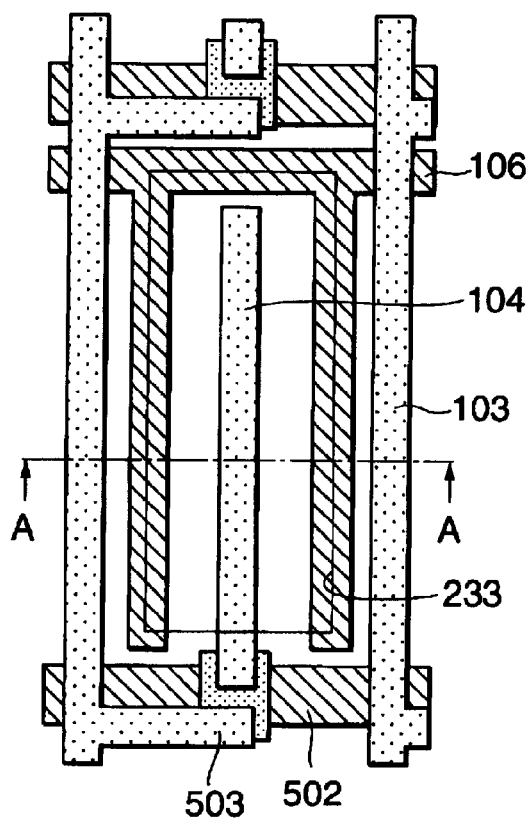
FIG. 1A is a schematic plan view of an electrode pattern of a color LCD cell constituting one of pixels of a TFT substrate employing IPS system to which the present invention is applied.
Figure 1B:
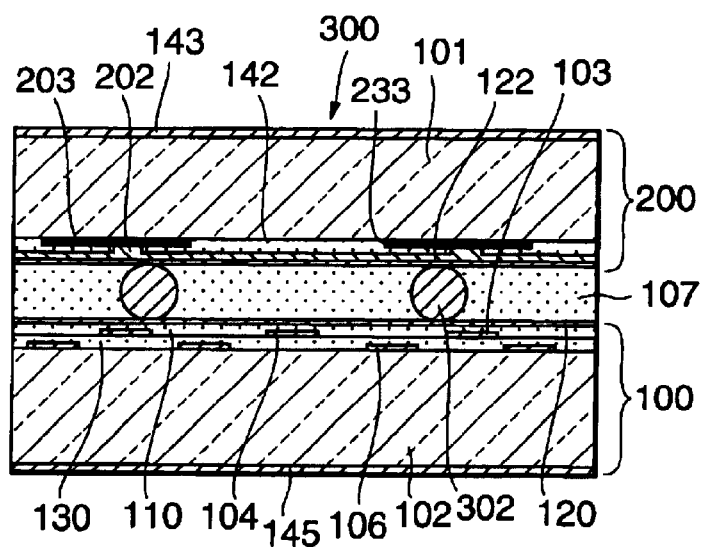
FIG. 1B is a cross section taken along a line A—A in FIG. 1A.

Before describing the present invention, a basic construction of an IPS type LCD panel will be described with reference to FIG. 1A and FIG. 1B. In FIG. 1A and FIG. 1B, an example of an electrode arrangement constituting one of pixels on a TFT side substrate of the IPS type LCD panel is shown. Referring to FIG. 1A, the display pixel is constructed with a scan line 502 connected to an external drive circuit, a signal line 103, a common electrode 106, a thin film transistor 103 as a switching element and a pixel electrode 104. In FIG. 1B, which is a cross section taken along a line A—A in FIG. 1A, the common electrode 106 is formed on an inner surface of a TFT side glass substrate 102 and the pixel electrode 104 and the signal line 103 are formed on the common electrode 106 through a gate insulating film 130. The pixel electrode 104 and the common electrode 106 are arranged alternately. These electrodes are covered by a protective insulating film 110 and an alignment layer 120 on the TFT side, which is necessary to align liquid crystal molecules 107, is formed on the protective insulating film 110 by painting and rubbed. Thus, the TFT side substrate 100 is formed.

A light shield 203 is provided in a matrix on an opposing side glass substrate 101, which becomes the CF substrate, and a color layer 142, which is necessary for color display, is formed on the matrix-shaped light shield 203. A leveling layer 202, which is necessary to flatten a surface of the opposing side substrate, is formed on the color layer 142. Furthermore, an opposing side alignment layer 122, which is necessary to align liquid crystal molecules 107, is formed by painting and rubbed. The rubbing direction is opposite to the rubbing direction of the TFT side substrate 100. Thus, the opposing side substrate 200 is provided.

Liquid crystal 107 and spacer particles 302 are sealed in a gap between the inner surface of the TFT side substrate 100 and an inner surface of the opposing side substrate 200. The gap between the TFT side substrate 100 and the opposing side substrate 200 is defined by a diameter of the spacer particle 302. Finally, a TFT side polarizer 145 is formed on an outer surface of the TFT side glass substrate 102 such that a light transmission axis thereof becomes orthogonal to the rubbing direction of the alignment layer 120 and an opposing side polarizer 143 is formed on an outer surface of the opposing side glass substrate 101 such that a light transmission axis thereof becomes orthogonal to the light transmission axis of the TFT side polarizer 145. Thus, a LCD panel 300 is completed.

Now, an embodiment of the present invention will be described with reference to FIG. 2A, FIG. 2B, FIG. 2C and FIG. 3.

Figure 2A:
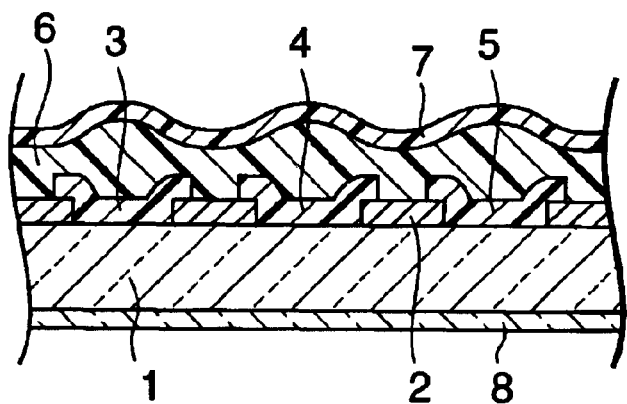
FIG. 2A to FIG. 2C are cross sections illustrating charging state on the side of the CF substrate of the LCD cell.

A color filter substrate shown in FIG. 2A is composed of a glass substrate 1 and three primary color layers, that is, an R (red) color layer 3, a G (green) color layer 4 and a B (blue) color layer 5, which are formed on the glass substrate 1 by patterning. In order to block light transmitted through overlapped areas of the respective color layers, a black matrix 2 is formed in those areas.

An overcoat layer 6 is formed on the color layers to commonly cover the latter layers. The overcoat layer 6 functions to relax the display irregularity of the color layers and to prevent impurities from flowing out from the color layers. An alignment film 7 is formed on the overcoat layer 6.

Figure 2B:
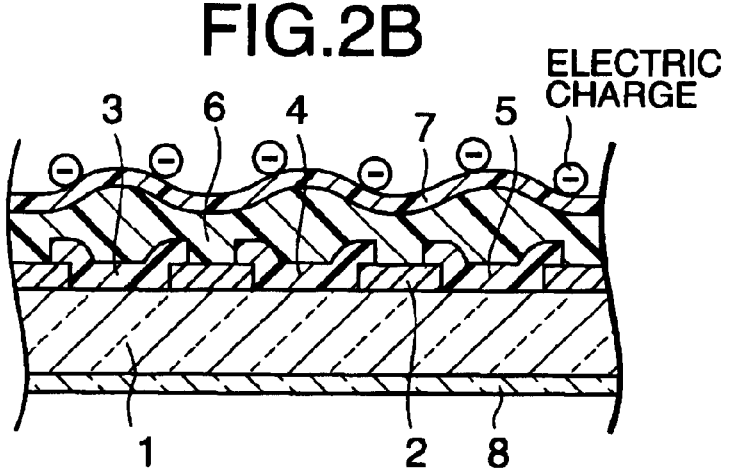

Before describing the embodiment of the present invention, the problems of the prior art will be described in detail with reference to FIG. 2A to FIG. 2C.

The CF substrate for the IPS LCD panel, which is shown in FIG. 2A, it is impossible to provide an electrically conductive film on the inner surface side of the glass substrate due to the IPS mode operation. Therefore, the surface side of the glass substrate is charged during a fabrication of the LCD panel. Assuming that the inner surface side of the glass substrate is charged negative as shown in FIG. 2B, positive charge is induced on a surface of the black matrix 2 as shown in FIG. 2C since resistivity of the black matrix is generally in the order of $10^5$ ($\Omega$.cm), which is very small compared with those of the color layers.

Figure 2C:
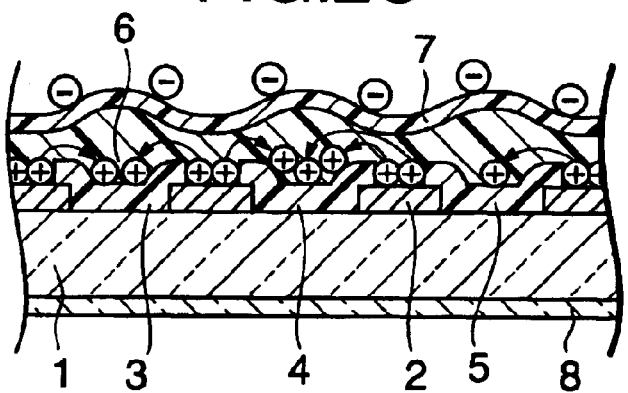

When there is a large difference in resistivity between the R, G and B color layers under such condition, there is a difference in charge injection between the color layers, so that a distribution of positive charge formed on surfaces of the R color layer 3, the G color layer 4 and the B color layer 5 varies, as shown in FIG. 2C.

On the other hand, the spacer particles for defining the cell gap of the color LCD panel are usually dispersed by using the dry dispersing method. The dry dispersing method is performed by dispersing spacer particles, which are preliminarily charged in one polarity individually, so that the spacer particles are dispersed uniformly. Therefore, when there is a variation of charge in each pixel as shown in FIG. 2B, the distribution of dispersed spacer particles becomes irregular.

Since the IPS type color LCD panel is normally black while the spacer particles in the pixel transmit light, the display quality of the LCD panel is substantially degraded dependent upon roughness and fineness of the density of spacer particles.

It is impossible to provide the electrically conductive film on the surface side of the glass substrate of the IPS type LCD panel as mentioned previously. In the present invention, in order to prevent the irregularity of charging, an ITO film 8, which is a transparent and electrically conductive film, is provided on the outer surface of the glass substrate 1. Although the ITO film 8 is effective to prevent the charge accumulation on the outer surface of the glass substrate during the fabrication process such as transportation of the substrate, the effect thereof for preventing accumulation of charge on the inner surface of the glass substrate is not enough. Therefore, charge injection into the respective color layers occurs due to the charge on the inner surface of the glass substrate. When the resistivity of the respective color layers vary substantially under such condition, the charge distribution becomes irregular, so that the display quality is degraded. In this case, even when charge injected into the respective color layers is removed by using an ionizer, etc., the charge distribution does not become uniform unless one hour or more lapses from a time at which the ionizer starts to operate at room temperature.

In order to solve this conventional problem, the present invention is featured by that the above mentioned degradation of display quality is prevented by combining the R, G and B color layers such that the difference in resistivity between these color layers becomes within a constant range. That is, the present inventors have found experimentally that it is possible to prevent the irregularity of distribution of charge injected into the R, G and B color layers and to obtain a uniform spacer dispersion by selecting the resistivity of each of the color layers such that it satisfies the following equation (1):

(max. resistivity)/(min. resistivity)$\leq 6 \times 10^2$ (1)

Figure 3:
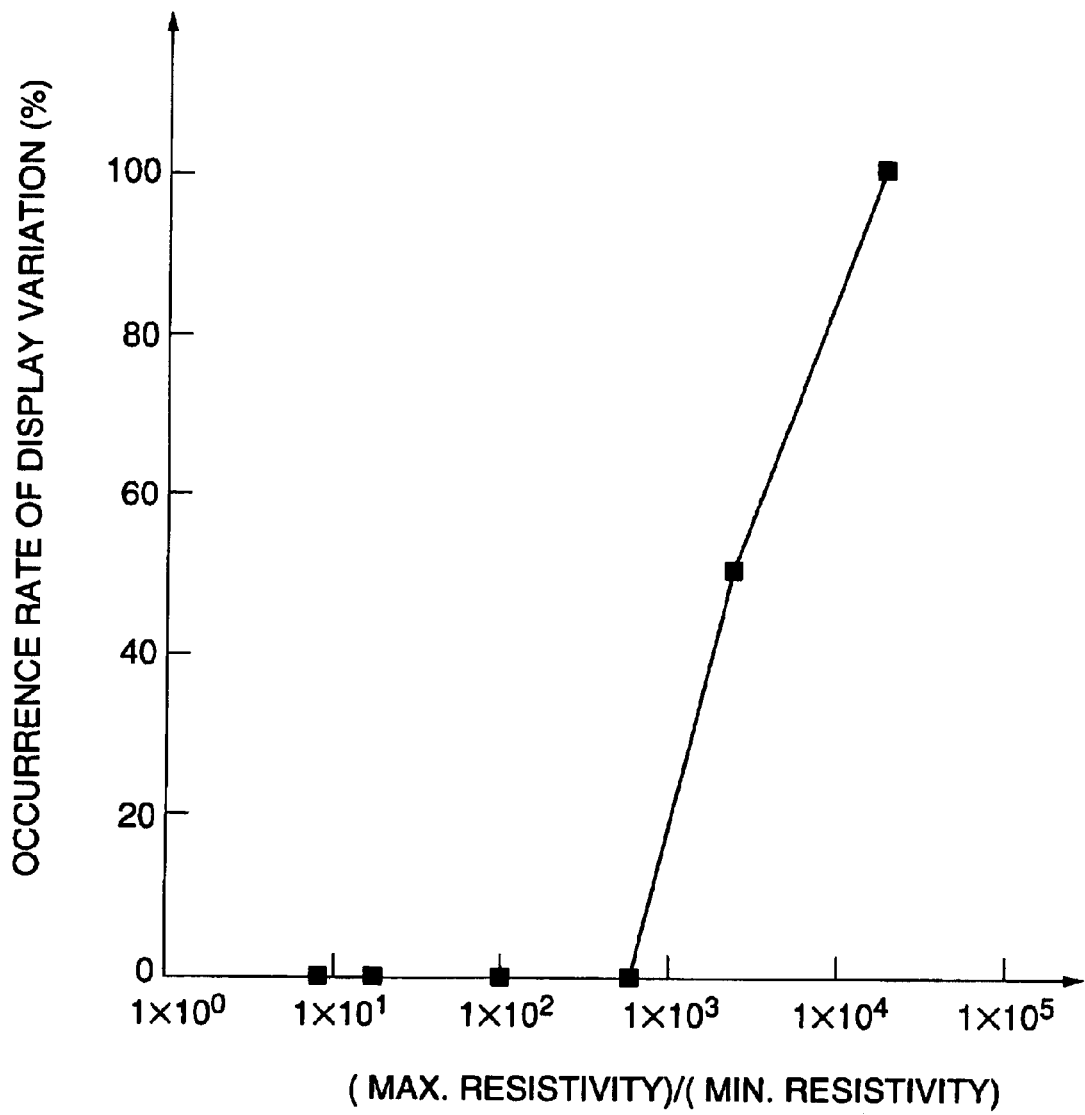
FIG. 3 is a graph showing the dependency of the display variation occurring rate, which is important to obtain the color layers of the CF substrate according to an embodiment of the present invention, on the ratio of maximum resistivity of color layer to minimum resistivity value thereof.

FIG. 3 shows the occurrence rate of display irregularity with respect to the (max. resistivity)/(min. resistivity) ratio of each color layer, which is based on data experimentally confirmed when the CF substrate of the present invention is applied to the IPS mode color LCD panel. As shown in FIG. 3, it has been confirmed that the degradation of display quality is sharply increased when the (max. resistivity)/(min. resistivity) ratio exceeds $6 \times 10^2$.

Incidentally, the above-mentioned publicationH11-38420 discloses an example where the resistivity of resins colored red, green and blue are $8.7 \times 10^{15}$ ($\Omega$.cm), $1.1 \times 10^{13}$ ($\Omega$.cm) and $1.8 \times 10^{13}$ ($\Omega$.cm), respectively. Since, in this example, the resistivity of the red colored resin is maximum and the resistivity of the green colored resin is minimum, the (max. resistivity)/(min. resistivity) ratio is $7.9 \times 10^2$. However, since this ratio is larger than the value defined by the present invention, it is difficult to remove the display irregularity.

As described, it is a feature of the IPS type color LCD panel that the display irregularity rate is sharply increased when the (max. resistivity)/(min. resistivity) ratio of the color layer exceeds a certain value. This condition can not be achieved in the conventional vertical field type LCD panel.

Furthermore, previously referred Japanese Patent No. 3044788 discloses an example where the resistivity of resins colored red, green and blue are $10^8$ ($\Omega$.cm), $10^7$ ($\Omega$.cm) and $10^7$ ($\Omega$.cm), respectively. In this example, the (max. resistivity)/(min. resistivity) ratio is small. However, since the resistivity of each color layer is small, this example is not suitable to apply to the IPS type color LCD panel.

According to the present invention, the combination of color layers is determined such that the (max. resistivity)/(min. resistivity) ratio of each of the color layers satisfies the equation (1) and the resistivity of each color layer is $10^{10}$ ($\Omega$.cm) or more, preferably, in a range from $1 \times 10^{11}$ ($\Omega$.cm) to $1 \times 10^{16}$ ($\Omega$.cm), so that the present invention can be applied to the IPS type color LCD panel.

Incidentally, the color layers of the IPS type color LCD panel according to the present invention are formed by dispersing respective pigments in transparent resin layers of such as known acrylic resin and the resistivity of each color layer is determined by the density of pigment and the additive agent such as dispersing agent therefor. Since the techniques realizing such color layers has been established already, detailed description thereof is omitted in this description.

On the other hand, there is a method for controlling the resistivity of each color layer by regulating, for example, constituents of the pigment or constituents of the dispersing agent. As another method, the resistivity of color layer is controlled by regulating the density of pigment. In the latter method, in order to obtain a required chromaticity, it is necessary to regulate the thickness of the color layer simultaneously with regulation of pigment density. In a further method, the resistivity of color layer is controlled by regulating the thickness of each color layer. In the latter method in which the thickness of each of the color layers are regulated, an irregularity of thickness of the color filter layer occurs necessarily. However, such thickness irregularity can be relaxes by using an overcoat layer. Additionally, it is possible to selectively control the resistivity of the color layers by regulating the density of pigment and the density of dispersing agent of each color layer.

Furthermore, the control of resistivity of each color layer is possible by using arbitrary two of the above mentioned methods. In such case, the regulation for obtaining chromaticity required as the color layer is generally performed not by regulating the thickness of the color layer but by selecting pigment and density thereof.

In a preferred embodiment of the present invention, the resistivity values of the respective color layers are made mutually close within a resistivity range in which resistivity values are not substantially deviated from the standard resistivity values of the respective color layers with which preferred chromaticity is obtained. That is, the resistivity values of the color layers are determined under the condition of the equation (1) by reducing the resistivity of the red color layer within a range satisfying the desired chromaticity and increasing the resistivity of the green color layer as well as the blue color layer within a range satisfying the desired chromaticity. Therefore, the above-mentioned effect can be achieved without departing from the desired chromaticity.

As described, the influence of electric charging of the CF layer side during the fabrication process of the IPS type color LCD panel can be excluded by setting the difference in resistivity between the respective color layers on the color filter side to $6 \times 10^2$ or less. Therefore, it is possible to remove the density variation of spacer particle in the color LCD panel, which is caused during the dispersing process of the spacer particles. Unevenness of spacer distribution causes degradation of display quality such as luminance variation and/or color variation of the LCD panel to be occurred and this is particularly true for the IPS type color LCD panel. This problem can be solved by the combination of the color layers according to the present invention.

The dispersion of spacer particles can be achieved by other method than the methods previously described. For example, as disclosed in the above-mentioned publication H11-38420, it is possible, in order to improve the display quality, to selectively arrange spacer particles on a light shield. According to this method, the spacer particles can be concentrated to the light shield by charging the light shield with one polarity which opposite to that of charge of the spacer particles. By applying the color layer combination according to the present invention to this method, it is possible to prevent the unevenness of spacer dispersion due to charging polarity.

As described hereinbefore, it is possible to make the difference in resistivity between the color layers in the CF substrate of the IPS type color LCD panel small by using the combination construction of the color layers, so that it is possible to prevent the influence of charging of the CF substrate side during the fabrication process thereof to thereby remove the density variation of spacer particles. Consequently, it is possible to reduce the degradation of display quality such as luminance variation of the IPS type color LCD panel.

What is claimed is:

1. An in-plane-switching type color liquid crystal display panel comprising:
   an electrode substrate having pixel electrodes and a common electrode juxtaposed thereon;
   a color filter substrate having a red color layer, a green color layer and a blue color layer separated from each other by a black matrix layer, a ratio of a maximum resistivity of each of said color layers to a minimum resistivity thereof being $6 \times 10^2$ or less;

spacer particles arranged between said electrode substrate and said color filter substrate; and liquid crystal layer sealed in a gap between said electrode substrate and said color filter substrate, wherein said spacer particles are dispersed by dry dispersion, and wherein the resistivity of each color layer is set to be $10^{10}$ ($\Omega$.cm) or more.

2. An in-plane-switching type color liquid crystal display panel claimed in claim 1, wherein said color layers and said black matrix are commonly covered by an overcoat layer.

3. An in-plane-switching type color liquid crystal display panel claimed in claim 2, wherein an alignment film is formed on said overcoat layer.

4. An in-plane-switching type color liquid crystal display panel claimed in claim 1, wherein each of said color layers is formed of a transparent resin containing a pigment and a dispersing agent.

5. An in-plane-switching type color liquid crystal display panel claimed in claim 1, wherein said electrode substrate constitutes an active matrix substrate including a plurality of said pixel electrodes driven by switching of thin film transistors connected to said pixel electrodes, respectively.

6. An in-plane-switching type color liquid crystal display panel comprising:

an electrode substrate having pixel electrodes and a common electrode juxtaposed thereon;

a color filter substrate having a red color layer, a green color layer and a blue color layer separated from each other by a black matrix layer, a ratio of a maximum resistivity of each of said color layers to a minimum resistivity thereof being $6 \times 10^2$ or less;

spacer particles arranged between said electrode substrate and said color filter substrate; and liquid crystal layer sealed in a gap between said electrode substrate and said color filter substrate, wherein said spacer particles are dispersed by dry dispersion, and wherein the resistivity of each color layer is set to be in a range from $1 \times 10^{11}$ ($\Omega$.cm) to $1 \times 10^{16}$ ($\Omega$.cm), so that a dispersion of the spacer particles is made uniform and degradation of display due to unevenness of spacer dispersion is reduced.

7. An in-plane-switching type color liquid crystal display panel as claimed in claim 6, wherein the resistivity of the red color layer is in a range from $1 \times 10^{13}$ ($\Omega$.cm) to $1 \times 10^{14}$ ($\Omega$.cm) and the resistivity of the green color layer as well as the blue color layer is in a range from $1 \times 10^{12}$ ($\Omega$.cm) to $1 \times 10^{13}$ ($\Omega$.cm).

* * * * *